Patented Feb. 22, 1949

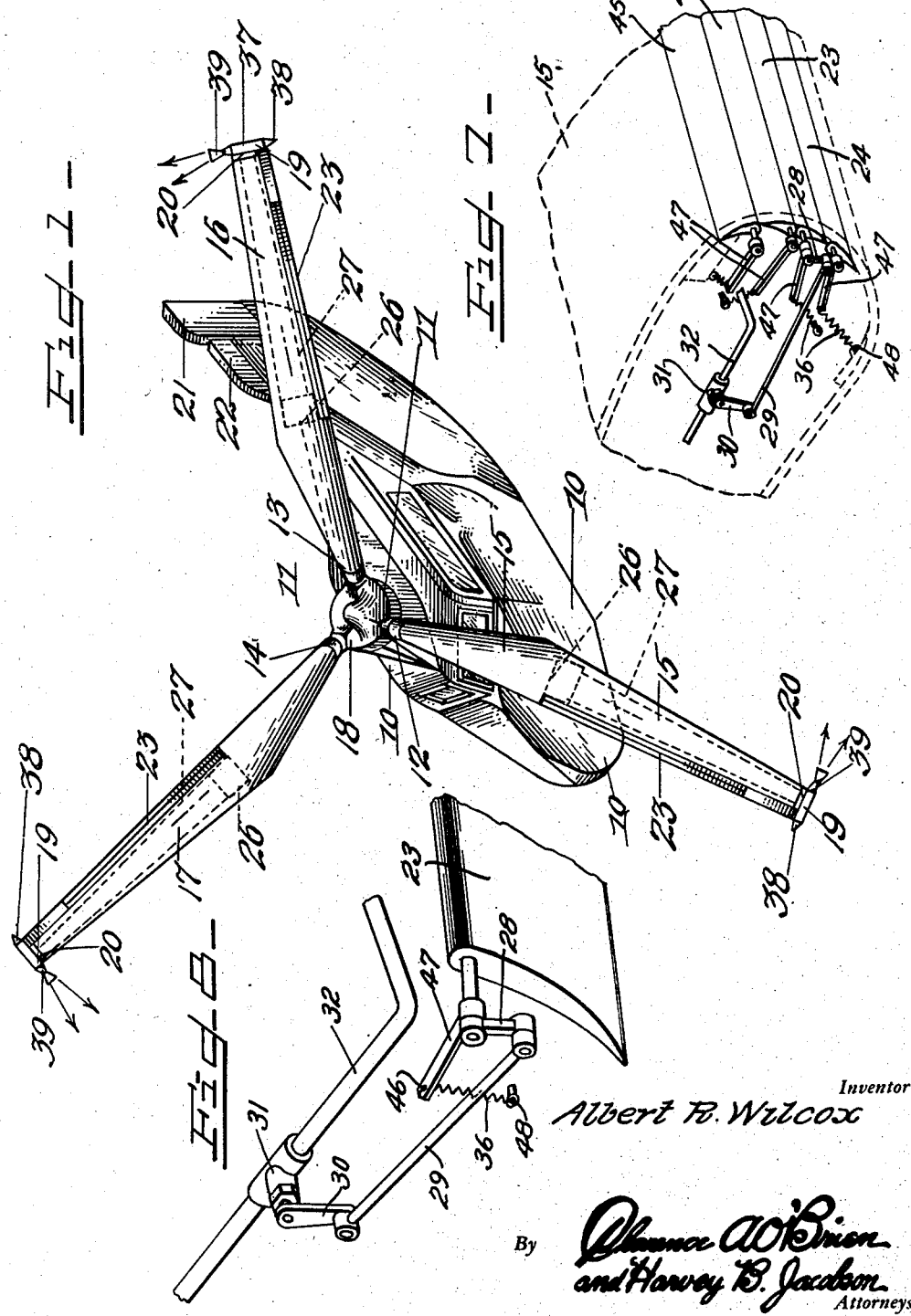

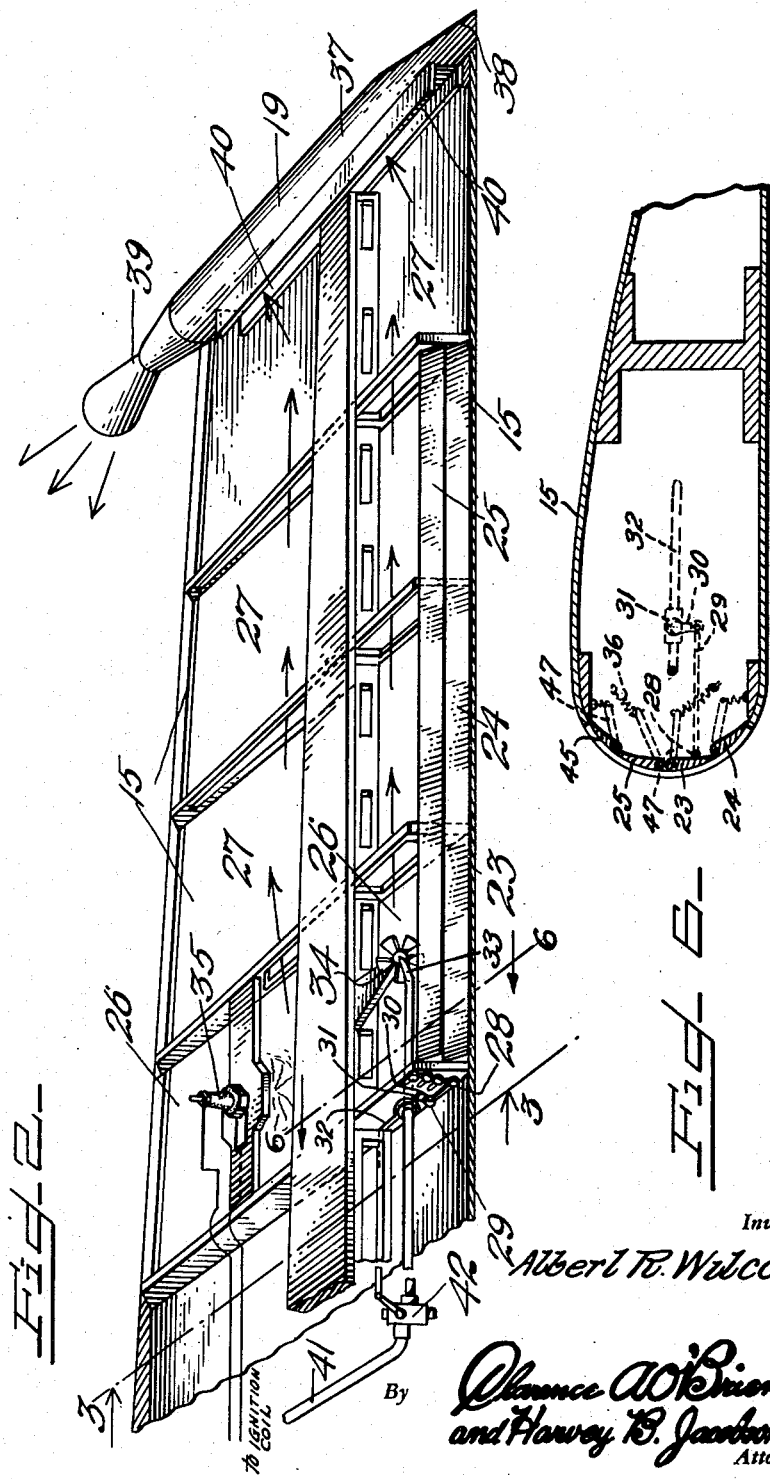

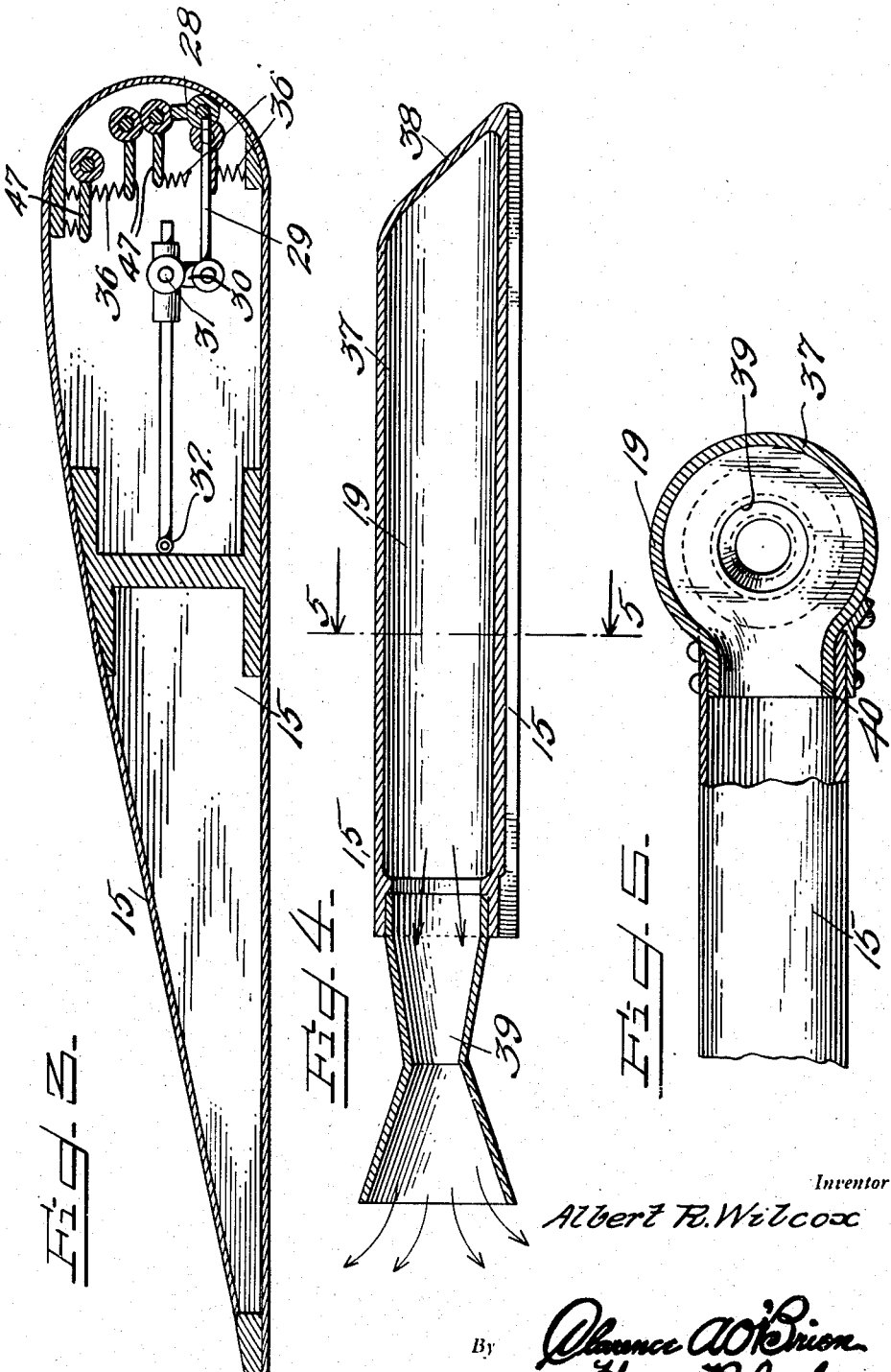

2,462,587

UNITED STATES PATENT OFFICE 2,462,587

JET PROPELLED HELICOPTER ROTOR

Albert R. Wilcox, Washington, D. C.

Application December 21, 1944, Serial No. 569,182

4 Claims. (Cl. 170—135.4)

The invention relates to improvements in helicopters and has particular reference to a jet-propelled helicopter rotor and controls therefor.

The invention further relates to an improved helicopter-type of plane having means for actuating the rotor thereof and forming the power-generating means therefor, without the employment of internal combustion engine units for propulsion of such structure.

The object of the invention is to provide means for actuating the helicopter rotor without the necessity for providing a counter torque-generating means in the body of the structure.

A further object of the invention is to provide a self-powered helicopter rotor for propulsion wherein the internal combustion power generating means is contained therein.

Another object of the invention lies in the providing of means for helicopter flight, whereby those unskilled in its operation may readily master the art of control thereof.

Further objects of the invention reside in the providing of a means of helicopter flight, allowing the use of a single means of rotor propulsion, without the aid of counter torque power means therefor, and still maintaining the utility of flexibly disposed rotor vanes therefor, and a unit operative as an autogyro for free unpowered flight and thus result in a unit capable of the highest factors of safety in unpowered vertical descent.

Obviously, a further object of the invention is in the providing of a helicopter-type of plane wherein its economies of construction places a unit thereof within the province of any one, thus eliminating the excessive cost of producing such structure.

With the foregoing and other features thereof which will hereinafter appear, I have shown the general embodiment of the invention, the essentials and scope thereof being set forth in the claims appended hereto.

Figure 1 is a perspective view of a helicopter showing the invention herein as applied thereto and forming part thereof.

Figure 2 is a perspective view, partly in elevation and partly in section, of one of the rotor vanes of the power-driving means therefor.

Figure 3 is a transverse sectional view on the line 3—3 of Figure 2, showing the general structure employed in one of the rotor vanes therefor.

Figure 4 is a longitudinal sectional view of one of the jet propulsion heads such as are disposed on the perimeters of the rotor vanes of the device, and Figure 5 is a cross-sectional view of the jet, impeller and rotor and vane-accelerator means for the structure.

Figure 6 is a sectional view taken substantially on the plane of section line 6—6 of Figure 2;

Figure 7 is a fragmentary perspective view of one of the rotor vanes showing the air control shutters thereon and the connection between one of the shutters and the valved fuel intake; and Figure 8 is a fragmentary perspective view of one of the shutters and the valved fuel intake together with operative linkage interconnecting the two.

Corresponding numerals of reference designate similar parts throughout the several views of the drawings.

Heretofore powered vertical flight in helicopters has been through either single or double rotor means, driven from internal combustion engines which are at best high torque generators, although rotor jet propulsion has also been employed of the type receiving its source of power from the body of the plane therefor. Such structures have been found both complicated and insufficient.

The invention herein, therefore, proposes to eliminate all torques by causing the power for operating the rotor to be generated in the rotor itself, thus leaving only a free bearing connection between the rotor and the body of the helicopter. It is proposed to generate the power directly in the rotor by mixing a stream of air with the fuel vapor within the rotor vane blade, igniting such mixture within said vane blade and exhausting the gas therefrom through jet nozzle means connected therewith and disposed on the trailing edge end of said rotor vane. The reaction of said jet nozzle comprises the impeller means for the rotation of said rotor. The structure for such a power source involves considerable economy as compared with the cost of high powered combustion engine power generators.

The use of a single free mounted rotor, as is provided herein, permits the use of flexible vane-mounting as is utilized on the autogyro-type of plane, thus assuring a stable flight under its power source, and a safe unpowered vertical descent in case of the power failure in the unit.

The invention hereinafter described eliminates all counter-torque from the body of the unit and removes the requirement of torque balancing controls, the latter being employed by present type helicopters. Should forward motion be gained by altering the angle of attack of the rotor means to a slightly forward position, and if directional control is provided for by an air-operated rudder, there would be but three controls to coordinate, such comprising only a throttle and stick with wheel disposed thereon, a control means readily handled by the unskilled.

In the drawings forming part hereof, 10 designates the body of a helicopter, having mounted thereon a free bearing 11 provided with flexible couplings 12, 13 and 14 therefor, and having secured therein rotor vane blades 15, 16 and 17, the combined structure as defined constituting the helicopter rotor 18 for the unit. It will be noted here that the activation of the rotor generates both lift and forward movement of the helicopter.

The rotor 18 is rotated by, or first impelled and then accelerated into rotation by means of the reaction of the jet nozzles 19 mounted on the outer ends 20 of the vanes 15, 16 and 17 thereof, and the direction of movement of the plane as a unit is controlled by changing the plane of rotation of said rotor 18 to downward diagonal planes or in the direction in which propelled movement is desired.

The flight direction of the air-car is controlled by either the rudder vanes 21 or 22 therefor, vane 21 controlling by interaction with the air during forward movement, and vane 22 by reason of interaction with downward flow of air when there is no forward motion thereof, and both of said vanes 21 and 22 being operated by a unit control means therefor.

At a point along the frontal edges of each of said rotor blades 15, 16 and 17, air control shutters 23, 24, 25, and 45 are disposed and extend over approximately 60 per cent of the length of said blades. When the vanes move in rotation or in a forward direction into the air, the resultant air flow forces the shutters to open, thereby admitting air to combustion chamber 26 formed in a steel-jacketed compartment in each rotor blade, and into the heating chambers 27 of each of said rotor vanes of the rotor 18. When shutter 23 of the vane assembly air control opens, it operates lever 28, and, through the levered links 29 and 30, causes control valve 31 of any conventional design and indicated diagrammatically, on fuel supply pipe line 32 to open. The opening of valve 31 allows fuel to flow through pipe line 32 to nozzle 33 and impinge against a distributor 34, the latter in the form of a fan-like structure which is rotated and activated by means of the action of the pressure of fuel through the ejector nozzle 33, and partially by the action of the air entering through the shutters of the air control means therefor. Thereby, when the shutters are admitting air to the combustion chamber 26 in each rotor blade, it carburates the fuel impinged against the vapor distributor 34 of the device.

When the fuel mixture has progressed to the required volume in combustion panel chamber 26 in each rotor blade, and carburated to the proper point, it contacts the area therein with spark plugs 35 forming part of a timed ignition system, is ignited and builds up an internal pressure in chambers 26 and 27 until it equals the pressure of the air against the shutters of the air control. At the point when the internal pressure in said chamber is equal to the external pressure, the shutters are closed by the action of springs 36 controlling the air intake means therefor on each of the vane blades 17 of the rotor 18 thereof. The springs 36 are terminally secured as at 46 to links 47 carried by the shutters and to the side walls of the rotor blades as at 48.

The internal pressure within chamber 26 being equal to the external pressure on the shutter means, closes said shutter 23 and allows the pressure in said chamber to build up and eject the combustion gases and heated air therefrom by means of the jet nozzles 19 therefor, said nozzles being formed of cylindrically contoured casings 37, stream lined on their front ends at 38, having venturi-shaped exhaust passages 39, and apertured walls forming communicating ducts 40 between said chambered sections 26 and 27 and the jet impellers and rotor vane accelerator means of the rotor-actuator means for helicopters of the character as is described herein, said jet propulsion means exhausting the gases from the rotor vanes thereof at a tremendously increased high velocity and by reason of the reaction therein of said jet nozzle, the blade is accelerated into forward rotative moment.

The closing of shutter 23 causes said fuel valve 31 to close, shutting off the fuel supply. When the pressure within chamber 26 again drops below the pressure of the air outside of the shutters, the air pressure opens said shutter and the cycle as described is repeated.

Said control springs 36 on each of the respective shutters 23, 24, 25, and 45 are loaded sufficiently to maintain said shutters closed when the rotor vane blade is stationary. Power control of the structure is obtained by placing in the main fuel pipe line 44 a control valve 42 therefor, since the fuel supply is maintained under pressure and the valve opening permits the fuel to flow, the increase of fuel feed being an advantage hereunder, as it increases the energy per cycle and the number of cycles of the rotor means in given time.

The structure as described comprises the use of an air-operated shutter means to control the cycle of operations. A cam disposed at the hub of the rotor could be utilized equally as well to control said cycle, or an automatic timing mechanism could be similarly employed, and, too, a blower device could likewise form an operative part of the unit to force air into the chamber rather than rely on the pressure developed by the rotation of the rotor vanes.

It is wholly within the scope of the invention to use a means wherein shutters, blowers or other and like apparatus are eliminated. The difference in the pressure between the frontal and trailing or tip rims of the rotor vanes when actuated is sufficient to cause the combustion gases and heated air to be exhausted through the nozzle jets and cause instant rotation of the rotor head.

For the purposes of efficiency of the invention in operation, it is noted that the overall effect of my jet-propelled structure is the result of the internal jet capacity and the outside mechanical capacity therefor. The internal jet efficiency is a measure of how well the heat energy of the fuel is converted to the kinetic energy of the gases.

An example of their mathematic factors is:

$$\text{Jet efficiency} = \frac{\text{Kinetic energy}}{\text{Work available in fuel}}$$

The factors being proportional.

$$K.E. = \tfrac{1}{2} M_j V_j^2$$

Where $M_j$ is mass of gas ejected and $V_j$ is the gas velocity. It is apparent that the higher $V_j$, the better the efficiency. The mechanical efficiency may be expressed thus:

$$\text{Mechanical efficiency} = \frac{V_j + V_m}{2V_j}$$

Therefore, where $V_j$ is jet velocity and $V_m$ is the velocity of the mechanism carrying the jet means of propulsion, the mechanical efficeincy approaches 100 per cent, as the velocity of the mechanism nears the velocity of the jet.

From these two conditions, it is apparent that high overall efficiency could be obtained with a high velocity jet in a mechanism traveling at high speeds. The high velocity may be reduced by increasing the mass of gas ejected without decreasing the efficiency, this result being limited, however, because of the large bulk of the structure at low velocities.

It is obvious that by placing the jets at the tip rims of a rapidly rotating rotor means, it is possible to obtain the required velocity for high efficiency without an overly bulky structure and without making it necessary to maintain the total apparatus moving at high speed.

The operation of the invention is defined hereinabove in a combined description of the structure thereof, the elements involved and the corelated functioning of the various means employed to effect the result thereof, and therefore manifoldly apparent that said structure may be varied in many ways without departure from the spirit and scope of the claims forming part hereof.

What I claim is:

1. A helicopter rotor vane comprising an air admission and mixing chamber, disposed axially of the vane and having air inlet shutters extending along the leading edge of the vane, fuel inlet means opening into said mixing chamber, a combustion chamber disposed parallel to and in juxtaposition with the mixing chamber and in continuous but restricted communication therewith, igniting means in said combustion chamber, jet tubes positioned at the outer ends of the vane and discharging rearwardly thereof, port means connecting both said chambers with said jet means.

2. The combination of claim 1 including a control valve in said fuel inlet means, and a linkage connecting one of said air inlet shutters to said control valve for operation thereby.

3. The combination of claim 2 including spring means urging said shutters into closed position.

4. The combination of claim 1 including a mixing fan carried by said fuel inlet means and relatively positioned in said mixing chamber, said fan being disposed in the flow of air through said shutters and operated thereby.

ALBERT R. WILCOX.

REFERENCES CITED

The following references are of record in the file of this patent:

UNITED STATES PATENTS

| Number | Name | Date |
|---|---|---|
| 1,519,444 | Fales | Dec. 16, 1924 |
| 1,569,607 | Beck | Jan. 12, 1926 |
| 2,142,601 | Bleecker | Jan. 3, 1939 |
| 2,397,357 | Kundig | Mar. 26, 1946 |

FOREIGN PATENTS

| Number | Country | Date |
|---|---|---|
| 227,151 | Great Britain | Jan. 12, 1925 |
| 366,450 | Great Britain | July 30, 1930 |
| 423,590 | France | Feb. 20, 1911 |

OTHER REFERENCES

Article "Wasted Talent," Flight (British magazine), October 5, 1944, pp. 364–370. (Copy in Div. 18, 60–35.6.)